United States Patent Office 3,378,492
Patented Apr. 16, 1968

3,378,492
DIENE POLYMERS GRAFTED WITH DIENOPHILE MONOMERS AS OIL ADDITIVES
Won-Ryul Song, Jersey City, and Darrell W. Brownawell, Scotch Plains, N.J., assignors to Esso Research and Engineering Company, a corporation of Delaware
No Drawing. Filed June 30, 1966, Ser. No. 561,729
6 Claims. (Cl. 252—51)

ABSTRACT OF THE DISCLOSURE

Multi-functional, thermally stable oil additives are prepared by grafting a $C_3$–$C_{25}$ ethylenically unsaturated, nitrogen-containing monomer such as acrylonitrile onto a polymeric hydrocarbon backbone such as a polymerized conjugated $C_4$–$C_5$ diolefin.

---

This invention relates to lubricants and more particularly relates to lubricating oil compositions containing as additives, reaction products of unsaturated hydrocarbon polymeric compounds with unsaturated, polar nitrogen-containing organic compounds. Still more particularly, the invention relates to lubricating oil compositions containing multi-purpose additives which are especially outstanding as V.I. improvers and as ashless sludge dispersants having excellent thickening power and oxidative stability such as, for example, the reaction products of polybutadiene with nitrile monomers, e.g., acrylonitrile.

The utilization of additives in lubricating oil compositions is well-known. These additives are used to improve one or more characteristics of the lubricating oil compositions such as viscosity index, oxidation resistance, detergency, anti-wear properties of the oil and the like, and are employed extensively in lubricating oil compositions for internal combustion engines such as automotive and aviation engines. Due to the increasing severity of engine operation, there is a continuing and critical need for new and improved additives which are capable of imparting improved characteristics to a lubricating oil composition. Preferably, such new additives will improve more than one characteristic or property of the oil.

In accordance with this invention, a new class of products has been found which is exceedingly useful as additives for lubricating oil compositions. These new products are outstanding V.I. improvers and, in addition, demonstrate usefulness as ashless sludge dispersants as well as anti-wear, oxidation resistance, and the like activity. Lubricating oil compositions of this invention comprise a major proportion of a lubricating oil and a minor, but V.I. improving proportion of a reaction product of an unsaturated hydrocarbon polymeric compound, e.g., polybutadiene, with an unsaturated, polar nitrogen-containing organic compound, e.g., acrylonitrile, which is grafted thereon.

Attempts have been made in the past to modify the properties of unsaturated hydrocarbon polymeric compounds and impart more than one desired characteristic or property by copolymerizing the starting monomer with various dissimilar compounds, e.g., acrylonitrile. The resulting copolymers, i.e., interpolymers, of the unsaturated hydrocarbon compound, e.g., butadiene are characterized as being composed of single chain polymers on which the butadiene groups (B) are interposed with linearly recurring groups (A) of the acrylonitrile compound as follows:

B—B—A—B—A—B—B—A—A—B—A—B—B

This method of producing the desired copolymers is not entirely satisfactory inasmuch as the dissimilar compounds generally fail to impart the desired properties and the resulting copolymers, in many cases, possess an entirely different set of properties than is desired. Furthermore, as there is not definite control over the order in which the monomers add to the polymer chain, the copolymers produced rarely, if ever, have the same molecular structure or physical properties and standardization of the copolymers and, thus, their application is quite difficult.

It has been discovered that the desired superior multifunctional properties are accomplished by preparing graft copolymers of unsaturated hydrocarbon polymers with nitrile monomers. Graft copolymers, as is understood in the art, constitute a chain or base polymer having grafted-on polymer chains of a monomer capable of addition polymerization and may be represented by the formula:

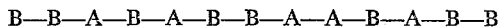

wherein B represents recurring units of the chain or base polymer and A represents units of the polymer chains of the grafted-on monomer. The graft copolymers possess unique properties and are different from copolymers prepared by polymerization of a mixture of monomers.

Accordingly, the present invention relates to nitrile-modified polymers formed by reacting pre-existing unsaturated hydrocarbon polymers with polymerizable nitrile monomers under pressures of from atmospheric up to about 2,000 atmospheres in the presence of a suitable catalyst. These nitrile-modified polymers are alleged to contain substituent nitrile groups or polymer chains thereof attached to the pre-existing unsaturated hydrocarbon polymer chain.

The unsaturated hydrocarbon polymeric compounds useful in the present invention have a number average molecular weight in the range of about 1,000 to 500,000 preferably about 50,000 to 200,000. These unsaturated hydrocarbon polymeric compounds should have at least 0.2 mol percent unsaturation (by the iodine-matured acetate method) and more preferably of about 2 mol percent to 100 mol percent. Illustrative of these unsaturated hydrocarbon polymeric compounds are the polybutadienes, natural rubbers, butadiene-styrene copolymers and partially hydrogenated derivatives thereof, butyl rubber, high unsaturation isobutylene-isoprene copolymers and other polyisobutylenes modified with butaidene, piperylene, etc.

A preferred class of unsaturated hydrocarbon polymeric compounds useful in the present invention are polymers of $C_4$ or $C_5$ conjugated diolefins, preferably butadiene, particularly butadiene polymers having a high proportion of cis-1,4-groups. A particularly suitable class of polymers of $C_4$ or $C_5$ conjugated diolefins are those which predominate in a 1,4-addition configuration and in which the 1,2-addition configuration does not exceed 10%. The polymers are formed from conjugated diolefins having 4 to 5 carbon atoms and no more than 1 methyl side chain. While butadiene is preferred, isoprene and 1,3-pentadiene may also be used, as well as copolymers of any of these diolefins. The different polymer characterizations in the instance of butadiene are as follows:

1,2-butadiene:

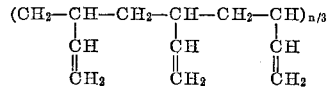

cis-1,4-polybutadiene:

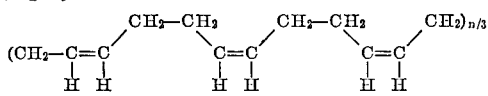

trans-1,4-polybutadiene:

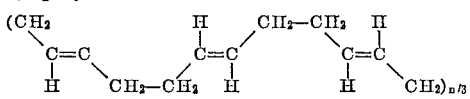

wherein in each instance $n$ is the number of butadiene units in the polymer.

Where the configuration is predominantly cis-1,4, that is, when the polymer contains about 80 to 100 percent of said configuration the polymer has the greatest potency. Where the extent of cis-1,4 configuration is less, that is, in those instances where a polymer contains about 30 to 50 percent cis-1,4 configuration and 40 to 60 percent trans-1,4 configuration, the desired potency is slightly reduced, but the stability to shear breakdown is enhanced. From a commercial standpoint V.I. potency is the more valuable property; accordingly, polymers having 80 to 100 percent cis-1,4 configuration are particularly preferred.

The polymerization processes for the preparation of conjnugated diolefins to high molecular weight polymers which are suitable for use in the present invention, e.g., in which the mode of polymerization is predominantly of a 1,4 configuration, are well-known in the art. The catalysts for such polymerization may comprise metallic lithium alkyls such as ethyl lithium, n-butyl lithium, hexyl lithium, or the like. They may also comprise lithium dihydrocarbon amides. Complexes of titanium trihalide, e.g., titanium trichloride and aluminum trialkyls, e.g., aluminum triisobutyls, may also be used.

The polymerization reaction is conveniently conducted in a solution using a nonpolar, nonacidic organic solvent, as for example, $C_3$ to $C_{16}$ straight chain, branched, cyclic paraffin or aromatic hydrocarbon. Polymerization temperatures may range from about 0° to about 150° C., preferably from about 20° to 80° C. Pressures usually range from about 1 to 100 atmospheres and preferably are maintained in the range of from about 1 to 3 atmospheres. Prior to polymerization the diolefins must be dried, as for example, by treatment with silica gel, alumina, or the like.

Broadly, the unsaturated, nitrogen-containing organic compounds contemplated by the present invention generally consist of carbon, hydrogen and nitrogen and may also contain oxygen. It will be understood, however, that the nitrogen-containing compounds may also contain substituent groups such as keto, hydroxyl, ether, mercapto, sulfide or sulfoxide. Generally, these nitrogen-containing compounds will contain about 3 to 24 carbon atoms and about one nitrogen atom per molecule.

The unsaturated, polar, nitrogen-containing organic compounds to which the present invention is particularly directed are nitriles having the formula:

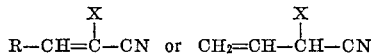

wherein R is a hydrogen atom or a lower alkyl, e.g., methyl, ethyl, and the like, X is a hydrogen atom, a halogen atom, a cyano or a lower alkyl group, e.g., methyl, ethyl propyl, butyl, and the like. Non-limiting examples of polymerizable nitrile monomers which are contemplated by the aforedescribed structure include acrylonitrile, methacrylonitrile, alpha-bromoacrylonitrile, alpha-chloroacrylonitrile, vinylidene cyanide, allyl cyanide, and the like.

The preparation of the final gross reaction product, e.g., nitrile grafted polybutadiene, may be accomplished in a number of ways known to the state of the art. One suitable method for nitrile monomers which do not readily homopolymerize is carried out in solution, that is, the polybutadiene along with a free radical type catalyst is dissolved in a hot solvent such as benzene, heptane, or cyclohexane and the nitrile monomer, e.g., allyl cyanide is introduced into the solution. A solution is heated at polymerization temperatures, from about 50° C. to 150° C. for several hours in the substantial absence of air or oxygen and, preferably, under a blanket of inert gas, e.g., nitrogen. Diluent oil is added and the light solvent and unreacted nitrile monomer are then removed. The remaining residue is a mixture of the graft copolymer of polybutadiene in diluent oil.

Suitable free radical catalytic initiators of the reaction between the polybutadiene and the polymerizable acrylonitrile monomer are the peroxide catalysts such as benzoyl peroxide, cyclohexyl hydroperoxide, acetyl peroxide, lauryl peroxide, and ditertiary butyl peroxide. Initiators of somewhat higher polymerizing efficiency are the azo catalysts such as alpha, alpha'-azobisobutyronitrile.

For those nitrile monomers which readily homopolymerize under free radical conditions a different reaction method is required. One such suitable method is to dissolve polybutadiene and the nitrile monomer, e.g., acrylonitrile, in a hot solvent, such as heptane, benzene or cyclohexane. The solution is then heated at polymerization temperatures, from about 50° C. to 200° C. and under pressure of 1 to 30 atmospheres for several hours in the substantial absence of air or oxygen. The above mentioned conditions promote the thermal adduction of nitrile monomers, e.g., acrylonitrile to polybutadiene. Inhibitors such as hydroquinone may be added to eliminate homopolymerization of acrylonitrile. Diluent oil is added and the light solvent and unreacted nitrile monomer are then removed. The remaining residue is a mixture of the graft copolymer of polybutadiene in diluent oils.

The proportions in which the above-described polar nitrogen monomers are to be used may range widely according to the ability of the unsaturated hydrocarbon polymeric compound and the polar nitrogen compound to react with each other, but normally should range from about 0.1 to 400, preferably about 10 to about 200 parts by weight of the polar monomer to 100 parts by weight of the unsaturated hydrocarbon polymeric compound.

The resulting reaction products contain in the range of from about 0.005 to 0.6 percent by weight of nitrogen (polar nitrogen compound) and may be prepared by reacting the olefinic hydrocarbon with from about 0.1 to 5 mol percent of the unsaturated, nitrogen-containing monomer. More preferably, the reaction products contain in the range of about 0.02 to 0.50 percent by weight of nitrogen (polar nitrogen compound). The proportions of ingredients and the reaction conditions, particularly the reaction time, are selected to produce reaction products containing the aforementioned nitrogen contents.

It will be understood that, if desired, two or more different polymeric unsaturated hydrocarbon polymeric compounds or two or more different types of unsaturated, polar, nitrogen-containing organic compounds may be employed in the present hydrocarbon, nitrogen-containing monomer systems.

Generally, the molecular weights of the final gross polymeric product of the present invention, employed as lubricant additives, will be in the range of about 1,000 to about 300,000 and preferably will be in the range of about 100,000 to 200,000. However, it will be understood that higher or lower molecular weight products may be prepared in accordance with the present invention, if desired.

When additives of the present invention are employed in lubricating oils, they are preferably added in proportions of about 0.01 to about 20.0% or more, preferably about 0.1 to 10.0%, and more preferably about 0.5 to 3.0 percent by weight. The proportions giving the best results will vary somewhat according to the nature of the additive, the nature of the lubricating oil base stock to which it is added and the specific purpose which the lubricant is to serve in a given case. For commercial purposes, it is convenient to prepare concentrated oil solutions in which the amount of additive in the composition ranges from 10 to 25 by weight, and to transport and store them in such form. In preparing a lubricating oil composition for use as a crankcase lubricant the additive concentrate is merely blended with the base oil in the required amount.

The products of the present invention may be employed not only in ordinary hydrocarbon lubricating oils but also in the "heavy duty" type of lubricating oils which have been compounded with such detergent type additives as metal soaps, metal petroleum sulfonates, metal phenates, metal alcoholates, metal alkyl phenol sulfides, metal organo phosphates, thiophosphates, phosphites and thiophosphites, metal salicylates, metal xanthates and thioxanthates, metal thiocarbamates, amines and amine derivatives, reaction products of metal phenates and sulfur, reaction products of metal phenates and phosphorus sulfides, metal phenol sulfonates and the like. Thus the additives of the present invention may be used in lubricating oils containing such other addition agents as barium nonyl phenol sulfide, calcium tert.-amylphenol sulfide, nickel oleate, barium octadecylate, calcium phenol stearate, zinc diisopropyl salicylate, aluminum naphthenate, calcium cetyl phosphates, barium di-tert.-amylphenol sulfide, calcium petroleum sulfonate, zinc methylcyclohexyl thiophosphate, calcium dichlorostearate, etc. Other types of additives such as phenols and phenol sulfides may be employed.

The lubricating oil base stocks used in the compositions of this invention may be straight mineral lubricating oils or distillates derived from paraffinic, naphthenic, asphaltic, or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc. Hydrogenated oils, white oils, or shale oil may be employed as well as synthetic oils prepared, for example, by the polymerization of olefins or by the reaction of oxides of carbon with hydrogen or by the hydrogenation of coal or its products. Also, for special applications, animal, vegetable or fish oils or their hydrogenated or voltolised products may be employed in admixture with mineral oils.

Synthetic lubricating oils may also be employed which have a viscosity of at least 30 SUS at 100° F. such as esters of monobasic acids (e.g., ester of $C_8$ Oxo alcohol with $C_8$ Oxo acid, ester of $C_{13}$ Oxo alcohol with octanoic acid, etc.), esters of dibasic acids (e.g., di-2-ethyl hexyl sebacate, di-nonyl adipate, etc.), esters of glycols (e.g., $C_{13}$ Oxo acid diester of tetraethylene glycol, etc.), complex esters (e.g., the complex ester formed by reacting one mole of sebacic acid with two moles of tetramethylene glycol and two moles of 2-ethyl-hexanoic acid, complex ester formed by reacting one mole of tetraethylene glycol with two moles of sebacic acid and two moles of 2-ethyl hexanol, complex ester formed by reacting together one mole of azelaic acid, one mole of tetraethylene glycol, one mole of $C_8$ Oxo alcohol, and one mole of $C_8$ Oxo acid), esters of phosphoric acid (e.g., the ester formed by contacting three moles of the mono methyl ether of ethylene glycol with one mole of phosphorus oxychloride, etc.), halocarbon oils (e.g., the polymer of chlorotrifluoroethylene containing twelve recurring units of chlorotrifluoroethylene), alkyl silicates (e.g., polymethyl siloxanes, polyalkyl siloxane, ethyl polysiloxanes, methylphenyl polysiloxanes, ethylphenol polysiloxanes, etc.), sulfite esters (e.g., ester formed by reacting one mole of sulfur oxychloride with two moles of the methyl ether of ethylene glycol, etc.), carbonates (e.g., the carbonate formed by reacting $C_8$ Oxo alcohol with ethyl carbonate to form a half ester and reacting this half ester with tetraethylene glycol), mercaptals (e.g., the mercaptal formed by reacting 2-ethyl hexyl mercaptan with formaldehyde, formals (e.g., the formal formed by reacting $C_{13}$ Oxo alcohol with formaldehyde), polyglycol type synthetic oils (e.g., the compound formed by condensing butyl alcohol with fourteen units of propylene oxide, etc.), or mixtures of any of the above (or with mineral, animal or vegetable oils) in any proportions may also be used.

For best results the base stock chosen should normally be that oil which without the new additive present gives the optimum performance in the service contemplated. However, since one advantage of the additive is that their use also makes feasible the employment of less satisfactory mineral oils or other oils, no strict rule can be laid down for the choice of the base stock. Certain essentials must of course be observed. The oil must possess the viscosity and volatility characteristics known to be required for the service contemplated. The oil must be a satisfactory solvent for the additive, although in some cases auxiliary solvent agents may be used. The lubricating oils, however, that may have been produced, may vary considerably in viscosity and other properties depending upon the particular use for which they are desired, but they usually range from about 40 to 150 seconds Saybolt viscosity at 210° F. For the lubricating of certain low and medium speed diesel engines the general practice has often been to use a lubricating oil base stock prepared from naphthenic or aromatic crudes and having a Saybolt viscosity at 210° F. of 45 to 90 seconds and a viscosity index of 0 to 50. However, in certain types of diesel engine and other gasoline engine service, oils of higher viscosity index are often preferred, for example, up to 75 to 100, or even higher, viscosity index.

In addition to the material to be added according to the present invention, other agents may also be used such as dyes, pour depressors, heat thickened fatty oils, sulfurized fatty oils, organo-metallic compounds, metallic or other soaps, sludge dispersers, anti-oxidants, thickeners, other viscosity index improvers, oiliness agents, resins, rubber, olefin polymers, voltolised fats, voltolised mineral oils, and/or voltolised waxes and colloidal solids such as graphite, molybdenum disulfide, or zinc oxide, etc. Solvents and assisting agents, such as esters, ketones, alcohols, aldehydes, halogenated or nitrated compounds, and the like may also be employed.

In addition to being employed in lubricants, the additives of the present invention may also be used in motor fuels, hydraulic fluids, torque converter fluids, cutting oils, flushing oils, turbine oils or transformer oils, industrial oils, process oils, heating oils, diesel oils and generally as detergents, viscosity-index improvers, sludge dispersants, and/or pour depressants in mineral oil products. They may also be used in gear lubricants and greases.

Example 1

As heretofore mentioned, it is preferred that the conjugated diolefin polymers employed predominate in a cis-1,4 addition configuration, e.g., greater than 80% cis-1,4 configuration being preferred. A suitable polymer can be prepared in the following typical manner wherein 300 ml. of petroleum ether (saturated with water) is cooled to 0° C. Eight ml. of titanium tetrachloride is then added to the petroleum ether. Thereafter, 50 ml. of n-heptane and 12 grams of lithium dispersion (35% dispersion in petrolatum) were added to the petroleum ether-titanium tetrachloride mixture and the mass is agitated for about 1 hour.

The resulting catalytic reaction product is then transferred to a storage vessel which has previously been flushed with helium.

Polymerization of a suitable polymer includes the steps of introducing 450 grams of petroleum ether into a polymerization vessel which has been flushed with helium along with 150 grams of butadiene and 4 ml. of the catalytic reaction product as prepared above. The reaction vessel is flushed with helium and sealed. The vessel is suitably heated, e.g., by means of a constant temperature bath, to a temperature of 50° to 55° for a period of about 24 hours with suitable agitation means being provided.

Infrared examinations of the resulting product generally indicate that the polymer contains greater than 90% cis-1,4-; about 2% trans-1,4-; about 0% 1,2-; and less than 7% 2,3-unsaturation, the total unsaturation generally being greater than 90%.

Example 2

A heptane solution (200 grams) containing 2.6 wt. percent of cis-1,4-polybutadiene was mixed with 0.4 gram of benzoyl peroxide dissolved in 10 grams of allyl cyanide. The solution was stirred under an inert nitrogen atmosphere for 30 minutes at room temperature before warming up to gentle reflux temperature. After 2 hours of refluxing, the solution was cooled down to about 30° C. and additional 0.4 gram of benzoyl peroxide dissolved in 10 grams of allyl cyanide was added. The solution was again stirred for 15 minutes before refluxing again for another 2 hours. The product was separated by precipitating from methanol. The product possesses oxidative stability, sludge dispersancy and V.I. of 145.4 in Reference Oil 150A; a solvent extracted, neutral paraffinic type oil of about 46.53 SUS at 210° F. and 189.9 SUS at 100° F. The unreacted polybutadiene is unstable to oxidation and has V.I. of 143 in Reference Oil 150A. (A solvent extracted, neutral, paraffinic type oil of about 46.53 SUS at 210° F. and 189.9 SUS at 100° F.)

Example 3

In a 300 ml. steel bomb reactor, 180 ml. of a mixture of 150 grams of 8.4% cis-1,4-polybutadiene in heptane and 0.1 gram of hydroquinone dissolved in 30 grams of acrylonitrile was charged. Air was replaced with nitrogen and then the reactor was pressurized with nitrogen to 500 lbs./sq. inch at room temperature. The bomb was sealed and rocked at a temperature of 150° C. for a period of 15 hours. The resulting product possessed good thickening power, oxidative stability, good sludge dispersancy and V.I. A 0.64% polymer blend in Reference Oil 150A had a V.I. of 147.

Example 4

In a manner similar to the preceding examples, a 8.4% cis-1,4-polybutadiene solution of heptane (1500 grams mixed with 1 gram of hydroquinone dissolved in 300 grams of acrylonitrile) was charged into a one gallon reactor and pressurized with nitrogen to 500 lbs./sq. inch at room temperature. The mixture was heated up to and maintained at a temperature of 350° F. while stirring for a period of 5 hours.

The reaction product dissolved in Reference Oil 150A (0.76% polymer blend) had a V.I. of 147 and good oxidation stability.

Sludge dispersancy was better than a comparative commercial product, a polyisobutenyl-succinimide having a molecular weight of 1,500–2,000.

|   | Rating |
|---|---|
| Polyisobutenyl-succinimide | 1 |
| The product grafted polybutadiene | 1.15 |

Example 5

An allyl cyanide grafted butadiene polymer was compared with a similar butadiene polymer, but one not containing allyl cyanide grafting thereon. The grafted copolymer was prepared in a manner similar to the preceding examples. Table I represents the data resulting from a comparison upon exposure to air and sunlight and a comparison of lube stability test data.

TABLE I.—OXIDATIVE STABILITY DATA
[Oxidation stability test in 150A Reference Oil]

| Test Conditions | Cis-1,4-polybutadiene (0.86 wt. percent) | Allyl cyanide grafted cis-1,4-polybutadiene (0.7 wt. percent) |
|---|---|---|
| Exposure to Air and Sunlight. | Polymer precipitates after 1 day. | Slight haziness no precipitates after 25 days. |
| Lube Stability Test:[1] | | |
| Time (hrs.): | | |
| 0 | 342.0 SUS | 269.1 SUS |
| 19 | 263.0 SUS | 235.8 SUS |
| 23 | 785.1 SUS | 287.0 SUS |
| Vis. Change [2] | 443.1 SUS | 17.9 SUS |

[1] Determined under accelerated oxidation conditions at 340° F.
[2] Viscosity after 23 hrs.—Viscosity at initial stage.

Viscosity change less than 225 is considered to be good acording to specification of Lube Stability Test and thus satisfactory performance is evidenced in this accelerated oxidation test.

Example 6

A 1.6 mole percent allyl cyanide grafted cis-1,4-polybutadiene in Reference Oil 150A was compared with polyisobutenyl-succinimide in Reference Oil 150A in order to determine sludge dispersancy effectiveness. In this sludge dispersancy test, the experimental polymers and polybutenyl-succinimide were blended in used motor oil respectively (wt. percent of polymer used, 1.0). The blended oil was transferred to centrifuge-tube and put under centrifugation for a sufficient time (usually 30 minutes to 2 hours) to see the separation of sludge. The relative heights of sludge dispersed bottom side of the oil phase to the clean supernatant of the oil phase are compared. The better the sludge dispersancy, the smaller the relative height of the clean supernatant in the tube. The resulting data indicated that the grafted copolymer of the present invention had a rating of about 1.1 as compared with the 1 rating of polybutenyl-succinimide.

EXAMPLE 7

This example is presented in order to illustrate that while cis-1,4-polybutadiene per se exhibits attractive features as a V.I. improver, it fails in actual engine operation because of lack of thermal stability. However, the grafting on of a nitrile functionality in accordance with this invention retains the attractive V.I. improver features while at the same time greatly improving the thermal and oxidative stability. These features are amply supported by the standard CRC–L–38 engine test which measures the amount of bearing weight loss in milligrams and by the L–1 (Supplement 1) diesel test which measures the extent of engine deposits formed during engine operation.

CRC–L–38 Engine test

| Polymer: | Bearing wt. loss (mg.) |
|---|---|
| Cis-1,4-polybutadiene | 99 |
| Cis-1,4-polybutadiene containing 0.3 mole percent acrylonitrile | 27.3 |
| Needed to pass | <50 |

L–1 Diesel test (supplement 1)

| Polymer: | Top groove fill, percent |
|---|---|
| Cis-1,4-polybutadiene | 36 |
| Cis-1,4-polybutadiene containing 0.5 mole percent acrylonitrile | 3 |
| Needed to pass | <28 |

EXAMPLE 8

In this example the efficacy of the grafted cis-1,4-polybutadiene compositions of this invention, with regard to their unusual viscosity-temperature properties, is illustrated by comparison with cis-1,4-polybutadiene per se in oil blends.

In the comparison an engine viscosity simulator as disclosed in U.S. Ser. No. 456,343, filed May 17, 1965, as incorporated herein by reference, was utilized. Said engine viscosity similator comprises a sample holder provided with a cavity and with means for controlling the temperature thereof. A sleeve is fixed within said cavity with a spindle adapted to rotate within said sleeve. The spindle comprises, in combination, a shaft, an insulator and a drum. The drum is provided with a pair of substantially symmetrical flats which create a continuously varying shear weight which similates, to a degree heretofore unattainable, engine viscosity. The spindle is driven by means of a gear train responsive to a motor which gear train and motor also drive a tachometer for measuring rate of evolution of said spindle.

Broadly, the method of simulating the engine viscosity of a test oil comprises (a) cranking, at a substantially constant voltage, first oil sample of known viscosity (b) recording the thus-known viscosity and the corresponding cranking speed (c) repeating steps (a) and (b) using a second oil sample of known viscosity, thereby generating a positive viscosity versus speed (d) repeating step (a) using an oil of unknown viscosity (e) noting the cranking speed resulting from step (d) and reading the engine viscosity of said oil of unknown viscosity from said plot.

Using the above-mentioned engine viscosity simulator in the method referred to above, samples of cis-1,4-polybutadiene, acrylonitrile grafted cis-1,4-polybutadiene and polyisobutylene (molecular weight 130,000), were tested in a Solvent 150 Neutral. The resulting viscosities at 0° F. viscosity and 210° F. viscosity are recorded in Table II.

TABLE II

|  | 0° F. Vis., poise | 210° F. Vis., cs. |
|---|---|---|
| Base oil | 21 | |
| Base oil plus 0.8 wt. percent cis-a,4-polybutadine | 24 | 12.4 |
| Base oil plus 0.8 wt. percent cis-1,4-polybutadiene containing 0.5 mole percent acrylonitrile | 24 | 12.4 |
| Base oil plus 2 wt. percent polyisobutylene | 30 | 12.4 |

What is claimed is:

1. An oil composition having improved thermal and oxidative stability, whcih comprises a major proportion of a lubricating oil and a minor proportion, sufficient to improve the viscosity index of the oil, of an oil-soluble graft polymer prepared by grafting a $C_3$–$C_{24}$ ethylenically unsaturated, nitrogen-containing monomer from the group consisting of

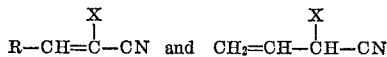

wherein R is hydrogen or lower alkyl and X is hydrogen, halogen, cyano or lower alkyl onto a polymer consisting essentially of a polymerized conjugated $C_4$–$C_5$ diolefin; said graft polymer containing 0.005 to 0.6% by weight of nitrogen and having a molecular weight within the range between about 1,000 and 300,000.

2. The composition of claim 1 wherein the graft polymer has a molecular weight within the range between about 100,000 and 200,000.

3. The composition of claim 2 wherein said polymer is a homopolymer of butadiene having at least 90% cis-1,4 configuration.

4. The composition of claim 1 wherein the nitrogen-containing monomer is acrylonitrile.

5. The composition of claim 4 wherein said polymeric backbone is a homopolymer of butadiene having at least 90% cis-1,4 configuration.

6. A lubricating oil composition comprising a major proportion of a lubricating oil and a minor proportion of a polymer consisting essentially of a conjugated diolefin having from 4 to 5 carbon atoms and having grafted thereon from about 0.1 to 5 mole percent of an unsaturated polar, nitrogen-containing organic compound having the formula

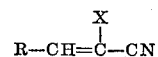

or

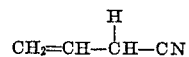

wherein R is a hydrogen or a lower alkyl and X is a member selected from the group consisting of hydrogen and halogen atoms and cyano and lower alkyl groups, said graft polymer having a molecular weight within the range between about 1,000 and 300,000.

References Cited

UNITED STATES PATENTS

| 2,901,458 | 8/1959 | Banes et al. | 250—50 X |
| 2,965,571 | 12/1960 | Wuellner et al. | 252—50 |
| 3,312,621 | 4/1967 | Brownawell et al. | 252—59 |

DANIEL E. WYMAN, *Primary Examiner.*

PATRICK P. GARVIN, *Examiner.*